(12) United States Patent
Dunnmon et al.

(10) Patent No.: US 7,888,820 B2
(45) Date of Patent: Feb. 15, 2011

(54) DELOCALIZED INTRASTRUCTURE POWER GRID AND DEVICES

(76) Inventors: Jared A. Dunnmon, 9875 Forestglen Dr., Cincinnati, OH (US) 45242; Avishek Panth, 6448 Katherine Ann La., Springfield, VA (US) 22150

( * ) Notice: Subject to any disclaimer, the term of this patent is extended or adjusted under 35 U.S.C. 154(b) by 166 days.

(21) Appl. No.: 12/267,243

(22) Filed: Nov. 7, 2008

(65) Prior Publication Data

US 2010/0117452 A1    May 13, 2010

(51) Int. Cl.
*H02J 7/00* (2006.01)
(52) U.S. Cl. ............................................. 307/65; 307/2
(58) Field of Classification Search .................... 307/2, 307/65
See application file for complete search history.

(56) References Cited

U.S. PATENT DOCUMENTS

| | | | |
|---|---|---|---|
| 4,315,163 A | 2/1982 | Bienville | |
| 4,503,337 A | 3/1985 | Hafner et al. | |
| 5,372,522 A | 12/1994 | Hoeft | |
| 6,234,400 B1 | 5/2001 | Guyer | |
| 6,655,987 B2 | 12/2003 | Higashikozono et al. | |
| 6,840,799 B2 | 1/2005 | Yoshikawa | |
| 2001/0027804 A1* | 10/2001 | Inoue et al. | 136/256 |
| 2005/0109394 A1 | 5/2005 | Anderson | |
| 2008/0258470 A1* | 10/2008 | Khoo et al. | 290/1 A |

* cited by examiner

*Primary Examiner*—Robert L. Deberadinis
(74) *Attorney, Agent, or Firm*—Jim Passé; Passé Intellectual Property LLC

(57) ABSTRACT

The present invention relates to a delocalized power generation system with computer controls and storage optimization capacity. A plurality of power generating systems is linked to a building along with a plurality of electrical storage means. By selectively charging and discharging the storage means and by selectively picking which electrical generating means one uses, the generation of power to the structure is maximized.

16 Claims, 4 Drawing Sheets

DELOCALIZED INTRASTRUCTURE POWER GRID AND DEVICES

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a system for integrating a plurality of power generating systems into a building such as a home and to building materials for use with such system. In particular, it relates to delocalized power generation with computer control and storage for optimization from a plurality of power generating sources in a single structure.

2. Description of Related Art

Various types of power generating systems are available for alternatives to being connected to the power company grid. Such systems as solar power, wind power, backup power generators that use fossil fuel, and the like, can easily be attached to a home or other structure for such generation of power. Indeed, one frequently finds that multiple types of power generation can be used within a building. Solar cells and the like are normally grouped together and as an ensemble in order to provide power to charge an energy storage device such as a battery, capacitor, or the like, or provide power directly to the house via use of an inverter. In addition, solar cells have been integrated directly into building materials such as roof tiles and the like.

U.S. Pat. No. 6,840,799 issued Jan. 11, 2005 to Yoshikawa et al., discloses cable connectors with solar cells built into roof tiles. The main problem with this technology is the need to replace a perfectly good roofing tile when the solar cell breaks or wears out.

In U.S. Pat. No. 4,315,163 issued Feb. 9, 1982 to Bienville there is disclosed a multi-power system for supplying electrical energy to a house. The system described is a centralized system for providing power to a given house.

Currently there are no systems devoted to optimizing the use of multiple independent power generating systems such that could easily and conveniently be incorporated in to a single structure such as a house.

BRIEF SUMMARY OF THE INVENTION

The present invention relates to a system for providing power generation to a structure, wherein there are a plurality of power generators and power storage devices and a computer to calculate and control the operation of the power generation and distribution of the power to the structure.

Therefore, in one embodiment there is disclosed a delocalized system for providing intra-structural electrical power to a structure comprising:

a) a plurality of discrete electrical power generators positioned to provide electrical power to the structure;

b) a plurality of discrete electrical energy storage devices functionally associated with the plurality of power generators to store energy generated by the power generators;

c) a device for converting the stored electrical energy to provide electrical power to the structure; and d) a computational controller for optimizing when each discrete storage device will be charged by a power generator and when each storage device will deliver electrical energy to the converting device.

In another embodiment, there is also provided by the present invention a structural building material having incorporated therein wiring for attaching an external power generator to an energy storage system with a structure.

BRIEF DESCRIPTION OF THE DRAWINGS

FIG. 3b shows a house with a brick wall containing a plurality of bricks of FIG. 3a.

DETAILED DESCRIPTION OF THE INVENTION

Figure 1:
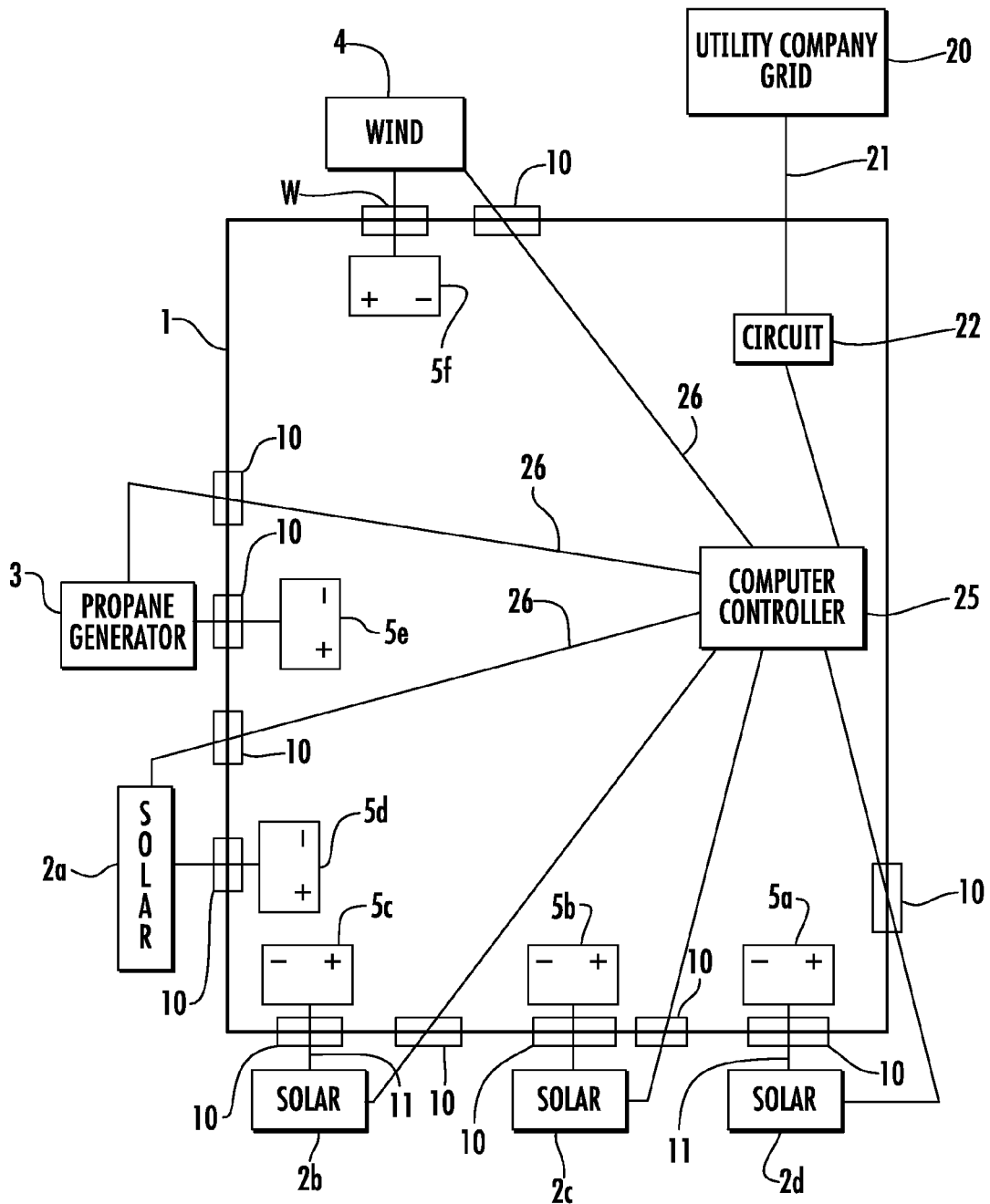
FIG. 1 is a diagram of the layout of a house with a multiplicity of power generators including a computer controller connected to each of the generators.

The present invention relates to the discovery that if a structure has a plurality of power generators and a plurality of power storage devices, then the system can be optimized by treating each generator in an independent fashion, including separate power storage devices dedicated to each power generator. By combining the system with a computational and controlling computer, each of the generators can be maximized in terms of when to charge and when to discharge into the structure electrical system to get the most out of the power generating system as a whole.

While this invention is susceptible of embodiment in many different forms, there is shown in the drawings and will herein be described in detail specific embodiments, the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or more. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms, means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the phrase "delocalized system" refers to a system which comprises several discrete power generators at different locations on, at or near a structure, such as a house. This positions the power generators to provide power directly to the structure. The power generators are for providing electrical power intra-structurally rather than extra-structurally, although in some embodiments they could also be so used. By two or more power generating systems, each with its own location rather than a single system in a single location, it is possible to maximize the amount of power generated over any single system acting in a continuous manner. While 2 power generators are within the scope of the invention, in one embodiment there are 3, 4, 5, 6, 7, 8, 9, 10 or more than 10 generators.

Such generating capacity is from a plurality discrete electrical power generators positioned to provide electrical power to the structure. Each generator can be, for example, a solar collection device wherein the solar cells are mounted in a conventional way or mounted using the building materials of the present invention. Typically, a solar wall of panels would be wired as one discrete unit; however, where desired in the practice of the invention, a multiplicity of power generators can be created by wiring a group of solar collectors in smaller groups so that each discrete packet of collectors can be controlled separately. On the other hand, separate solar collectors could be placed at several locations including different walls, multiple collectors on the same wall, the roof, freestanding and the like within the scope of the present invention. Where the present invention building materials are employed, wiring connectors integrated into the construction material would be used to attach each discrete power generator to a power storage device inside the structure. In the event that the power generator needs replacing, it is a simple matter to disconnect the power generator from the building material connectors. This is as opposed to building materials with the power generator, such as a solar cell built into the building material, which then necessitates replacing part of the building structure.

Other power generators could also be used in the plurality of power generators. In one embodiment, wind turbines are placed where if more than one could each operate discretely and power its own set of energy storage devices. Likewise, fossil fuel generators could be employed, as could water based generating systems. The common unifying characteristic of the power generators is that they are each local to the structure for generating power and having "discrete energy storage devices" associated with the power generators.

"Discrete electrical energy storage devices" relate to devices such as a battery or capacitor, or the like, that can store the energy generated by the power generators until needed by the structure. Discrete refers to storage devices which operate and store independent of one another, as opposed to a group of batteries wired in series or the like. Long term type storage batteries (including such power storage devices as capacitors and the like) are well known, however, an arrangement where each are dedicated to a single generator or a plurality of generators is a unique feature of the present invention. The storage devices would then have to have a device for converting stored electrical energy into electrical power for the structure. Where the house uses DC power the storage device itself would double as that device, however, where stored DC power needs to be converted to AC power an inverter or similar device will be used to provide the conversion to AC electrical power.

While it is anticipated that the relationship between power generators and power storage devices, in one embodiment, is a fixed one to one relationship, in other embodiments it would be possible to switch the set of storage devices being charged, thus, changing the one to one relationship. For example, when a currently functioning solar cell has completely charged a particular storage device, the system could determine there are other storage devices that are not fully charged and either assist or otherwise replace the different power generator for that storage device.

A computational controller, as used herein, refers to a computer or similar computational device positioned within the structure or elsewhere which monitors the system and makes decisions for optimizing power generation and storage for use in the structure. The computer comprises or further controls routing the current between the grid and the system and structure, turns on and off the power generators, adjusts which generators charge which power storage devices and decides which storage devices at a given moment will provide power to the structure. Therefore, at any given time some storage devices may be charging while others are providing power to the house and thus, discharging. The system computers can control wired or wireless devices for turning on or off the appropriate devices and can calculate with feedback from each generator and storage devices the amount of power being generated, and the choices of which optimized combination of generators and batteries, etc can be used. One skilled in the art in view of this disclosure could easily program a computer to optimize the relationship between the power generators, power storage devices and the grid electricity.

The structural building material of the present invention is a unit of wall construction, primarily outside wall construction, such as a brick, which has a connector built into it for attaching a power generator through the outside wall of the structure into the structure and attached to the system. By wall is meant not only the structural wall supporting the house but any side entrances into the building such as fences and the like. By placement of a plurality of these building materials, for example 2 or more or in some instances every brick on a wall, one could have several power generators and have enough connectors such that if one brick connector ceased to function properly one could attach the power generator to a different brick without a need to replace the connectors or even worse the building component.

Now referring to the drawings, FIG. 1 shows an embodiment of the present invention. Shown is the outline of structure 1 which could be a house or other individual building structure. In this embodiment, six different power generators are shown but as described above any number of a plurality of generators could be selected within the scope of the invention. Shown are independent solar collectors 2a, 2b, 2c and 2d for generating power. Also shown are propane power generator 3 and wind power generator 4. In this embodiment, each of the power generators has its own corresponding battery 5a through 5f. In this embodiment, each of the power generators are wired through a wall of structure 1, by use of building bricks 10 of the present invention, which contains a wiring portal for passing a wire 11 through to each corresponding battery.

The power from the utility company grid 20 comes into structure 1, via connection 21, in a normal wiring configuration and attaches to circuit breaker box 22. Circuit breaker box then distributes electricity to the structure 1 wherein breaker box is not shown, but understood in the art of electrical distribution. In the view of FIG. 1, the computer controller 25 monitors and controls each of the power generators via connections 26. In this view, the controller 25 can turn on or off each power generator as needed until each battery is charged or discharged to a desired degree. Not shown in FIG. 1, but shown in FIG. 2, is the battery's ability to convert energy to AC energy, via an inventor type device, and then be fed to the circuit breaker for distribution to the structure.

Figure 2:
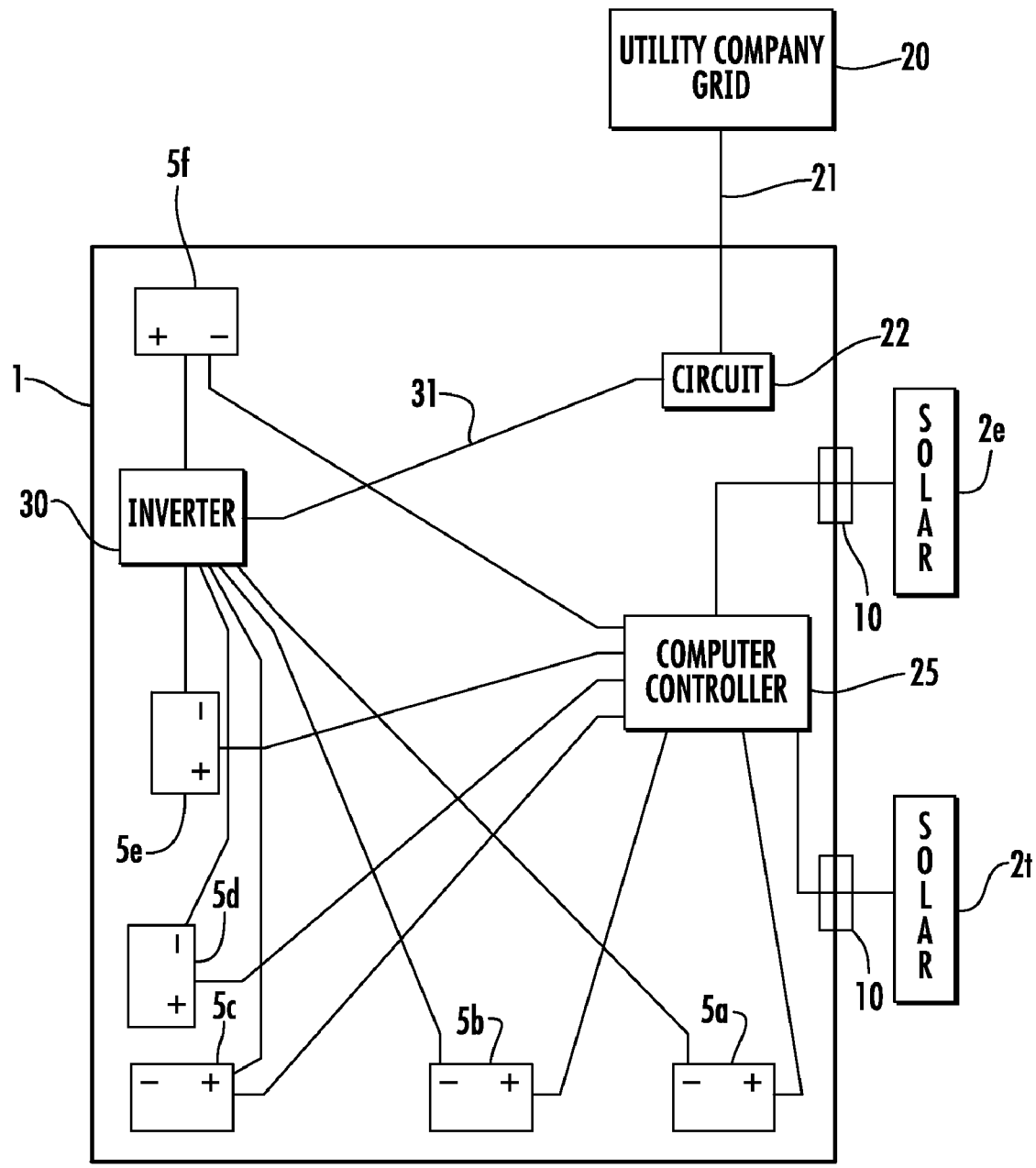
FIG. 2 is a diagram of the layout of a house with the computer controller, controlling the delivery of power to an inverter.

In FIG. 2 the structure 1 is depicted with the part of the system which controls the storage devices and the distribution to the household or structure AC circuit via the circuit breaker 22. Each battery 5a-5f is shown and controlled by the computer controller 25. The batteries can be used together or individually to release energy or can be charged individually, thus, optimizing the use of the plurality of batteries rather than charging one group of batteries as done currently in the art. The batteries are connected to inverter 30 which converts the stored energy to AC energy and diverts the current, via wires 31, to the circuit breaker 22.

The layout embodiment in FIG. 2 can easily be combined with FIG. 1. For control of the present system alternate power generators, solar power generators 2e and 2f are shown. In this embodiment, the power generators are connected directly to the computer controller 25 allowing for the computer controller 25 to decide which storage device will be charged and to decide which generator will charge it. This method allows a non-dedicated function for each of the power generators to exist and thus optimizes there use in the system.

Figure 3A:
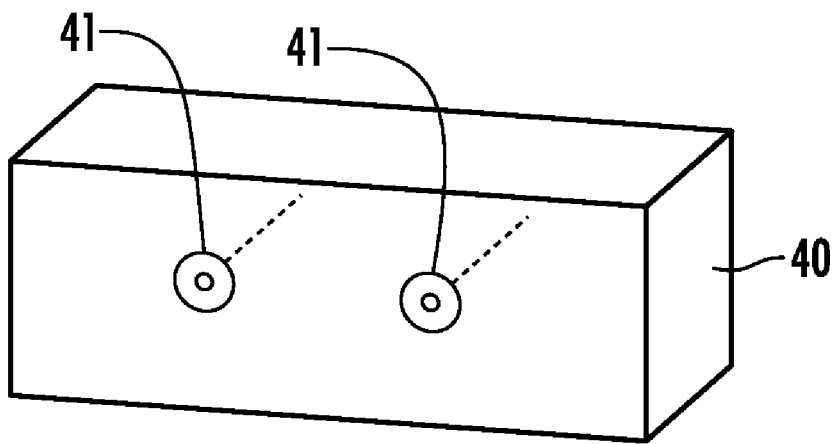
FIG. 3a is a brick with a pair of spaced connectors for connecting an exterior power generator through an exterior wall.
Figure 3B:
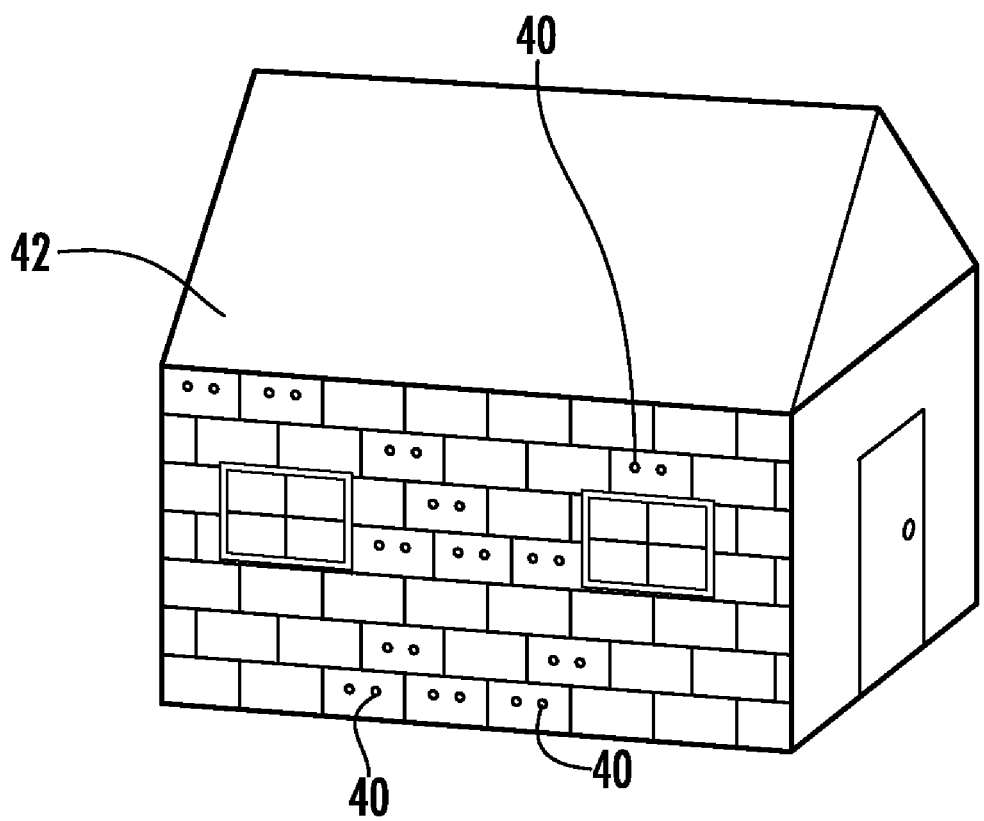

FIG. 3a shows a building material of the present invention. The power connector brick 40 is a standard household brick which has power connectors 41 imbedded all the way through the brick 40. There can be multiple connectors in each brick or a single connector as desired, however, in the particular embodiment there are two connectors depicted. While a brick is depicted any kind of structural building material could be substituted. By having several of the brick or other building components built into the structure, the system is extremely versatile as well as provides for easier replacement in cases of damage to the connector over time. FIG. 3b shows a structure 42 with one wall comprising a plurality of the bricks 40 of the invention shown in FIG. 3a. While not every brick has the connectors, there are sufficient numbers in the wall to attach a large number of power generators and leave room for using others as replacements over time, e.g. the life of the house.

Figure 4:
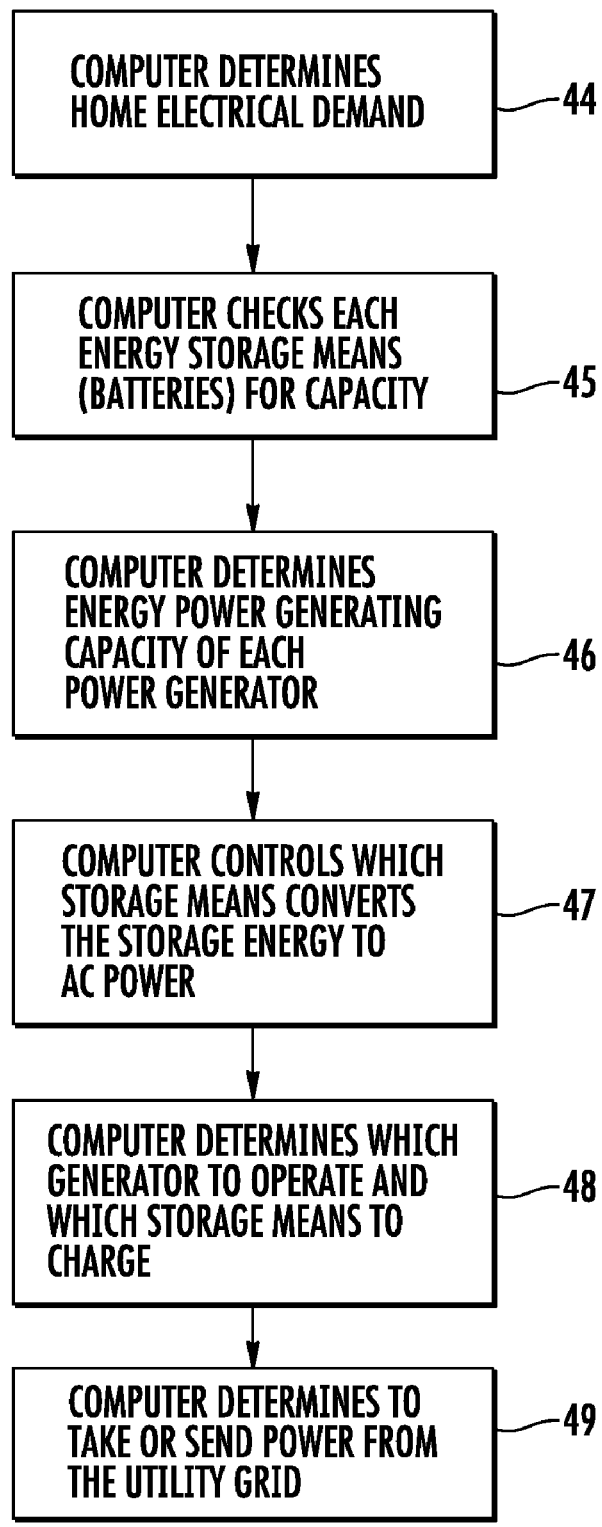
FIG. 4 is a flow chart of decisions to be made by the controlling computer.

FIG. 4 is a flow chart of an embodiment of the method of the present invention for controlling the power generation for a particular structure. While the chart shows an order to the steps 44-49, one skilled in the art and armed with this information could reorder the steps as needed and the claims herein should be so interpreted. In the first step, the computational computer determines a homes' electrical demand 44. This is accomplished by an estimation based on the current use or any manner that is convenient. Examples of other methods include the use of preprogrammed data based on region information such as time of year and local weather patterns. Further examples include a system that tracks the energy usage of the house, is tied into local weather service to adjust the system based on day to day and moment to moment weather conditions, or where input is preprogrammed data based on regions. Other methods include tracking of the demands of the house and using the demand patterns to help determine usage and operation of the system. Once the demand is determined the computer checks the power storage devices 45 for determination of the current capacity of the power generating storage devices for producing electricity. For example, by understanding the number of devices, their amperage, their current stage of charge, and the like, the computer could determine how much power can be generated and from which batteries the best power could be obtained.

The next step is for the computer to determine the power generating capacity of each of the power generators 46. The computer can then modify power generation based on time of day. For example, is it dark outside and thus no solar power generation possible, is there propane in the propane tank and the like, is it windy or is grid power particularly cheap at a given time. The computer then decides, based on desired parameters programmed into the computer, which power storage device will discharge in order to provide AC energy by delivering the storage device power to an inverter which will convert the DC energy to AC energy and deliver AC energy to the house 47. The computer then can determine which generator or generators will charge which the storage devices (such as a battery) 48. By completing the steps 44 through 48 the computer can optimize which storage devices get charged and which get discharged and optimize the use of the power generating capacity instead of always on and always depleting all the storage devices. Thus, the present method can provide a great deal more energy for the same equipment costs and can under the right circumstances be available to provide the entire load of the house or at least maximize the potential of such a system.

In an additional optimal step where a house is connected to a utility power grid 49, the computer can also compute when to take or send power to and from a utility power grid 49. Therefore, when there is not enough power being generated by the system the grid can supply the required power, but at other times where the utility allows it, the extra generated power can be sent back to the grid for a credit from the power grid utility thus optimizing totally the use of the produced energy.

The above description and embodiments are not intended to be limiting. Substitution of power generators, numbers, energy storage devices, computers, programming and the like in all its variation are intended within the scope of the claims which follow.

What is claimed is:

1. A delocalized system for providing intra-structural electrical power to a structure comprising:
    a) a plurality of discrete electrical power generators positioned to provide electrical power to the structure;
    b) a plurality of discrete electrical energy storage devices functionally associated with the plurality of power generators to store energy generated by the power generators;
    c) a device for converting the stored electrical energy to provide electrical power to the structure; and
    d) a single computational controller functionally connected to all of the discrete power generators for optimizing when each discrete power generator will operate and the amount of power that will be generated; when each discrete storage device will be charged by an operating power generator and how much power will be delivered to it; and when and how much electrical energy each storage device will deliver to the converting device.

2. A system according to claim 1 wherein the electrical power generators are selected from the group consisting of solar power generation, wind power generation and fossil fuel power generation.

3. A system according to claim 1 wherein one or more power generator has wiring integrated into the structures building material.

4. A system according to claim 1 wherein there is a plurality of power generator connecting devices built into the structures building material.

5. A system according to claim 1 wherein the structure is connected to a utility company power grid.

6. A system according to claim 1 wherein the energy storage device is a storage battery.

7. A system according to claim 1 wherein the device to convert the stored energy to provide electrical power is a power inverter.

8. A system according to claim 1 wherein the computational controller is a computer which is programmed to decide when to turn on and off each power generator based on selected criteria for optimizing power generation and usage.

9. A system according to claim 8 wherein the computer optimizes connecting the structure to a utility company power grid.

10. A system according to claim 8 wherein the computer can direct power back to a utility power company grid.

11. A system according to claim 1 wherein each generator is associated with one energy storage device.

12. A system according to claim 1 wherein a selected power generator can provide power to 2 or more storage devices under the control of the computational controller.

13. A system according to claim 1 wherein at least one generator is simultaneously associated with a plurality of the energy storage devices.

14. A system according to claim 1 wherein there are at least 3 discrete electrical power generators.

15. A structural exterior wall brick having incorporated therein wiring for attaching an external power generator to an energy storage system within a structure.

16. A house wherein at least one wall or section thereof consisting of a plurality of wall bricks according to claim 15.

* * * * *